(12) United States Patent
Tokunaga

(10) Patent No.: US 8,731,469 B2
(45) Date of Patent: May 20, 2014

(54) DATA RECEIVING APPARATUS, DATA TRANSMITTING APPARATUS, METHOD FOR CONTROLLING THE SAME AND PROGRAM

(75) Inventor: Koshi Tokunaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 239 days.

(21) Appl. No.: 12/936,219

(22) PCT Filed: Jun. 9, 2009

(86) PCT No.: PCT/JP2009/060819
§ 371 (c)(1),
(2), (4) Date: Oct. 4, 2010

(87) PCT Pub. No.: WO2010/001712
PCT Pub. Date: Jan. 7, 2010

(65) Prior Publication Data
US 2011/0028096 A1  Feb. 3, 2011

(30) Foreign Application Priority Data
Jun. 30, 2008  (JP) ................................. 2008-171237

(51) Int. Cl.
H04B 7/00 (2006.01)
(52) U.S. Cl.
USPC ....... 455/41.2; 455/436; 455/445; 455/432.1; 455/434
(58) Field of Classification Search
CPC ... H04W 76/00; H04W 80/085; H04W 80/08; H04W 84/18; H04W 36/00
See application file for complete search history.

(56) References Cited

U.S. PATENT DOCUMENTS 6,957,040 B1  10/2005  Tanaka ........................ 455/3.06
2006/0174206 A1 *  8/2006  Jung et al. ..................... 715/751
2007/0209023 A1  9/2007  Nakagawa et al.
2007/0299930 A1 *  12/2007  Wendelrup et al. ........... 709/217
2008/0090520 A1 *  4/2008  Camp et al. .................. 455/41.2

FOREIGN PATENT DOCUMENTS

EP  1 244 287 A2  9/2002
EP  1 404 108 A1  3/2004
JP  2001-216391 A  8/2001
JP  2003-108461 A  4/2003

(Continued)

OTHER PUBLICATIONS

European Patent Office, Supplementary European Search Report in connection with European Patent Application No. 09 77 3290, Jun. 29, 2011, 8 pages.

(Continued)

Primary Examiner — Fayyaz Alam
Assistant Examiner — Mohammed Rachedine
(74) Attorney, Agent, or Firm — Fitzpatrick, Cella, Harper & Scinto

(57) ABSTRACT

The present invention enables a data obtaining apparatus to select data to be transferred without maintaining a communication connection through close-proximity wireless communication. Accordingly, when a digital camera is communicatively connected to an external device through close-proximity wireless communication, a central processor of the digital camera obtains, from the external device, index information indicating a list of data stored in the external device. Next, the central processor terminates the communication connection to the external device and receives a designation of data to be transferred via an operation unit based on the index information. After having designated data to be transferred, an image processing unit of the digital camera obtains designated data from the external device when the camera is communicatively reconnected to the external device through close-proximity wireless communication.

12 Claims, 12 Drawing Sheets

(56) References Cited

FOREIGN PATENT DOCUMENTS

| | | |
|---|---|---|
| JP | 2003-198996 A | 7/2003 |
| JP | 2006-031531 A | 2/2006 |
| JP | 2007-174247 A | 7/2007 |
| KR | 10-2005-0004912 A | 1/2005 |
| KR | 10-2007-0081757 A | 8/2007 |
| WO | 2007/147447 A1 | 12/2007 |

OTHER PUBLICATIONS

European Patent Office, Communication dated Nov. 28, 2011, in connection with European Patent Application No. 09 773 290.3, 6 pages.

* cited by examiner

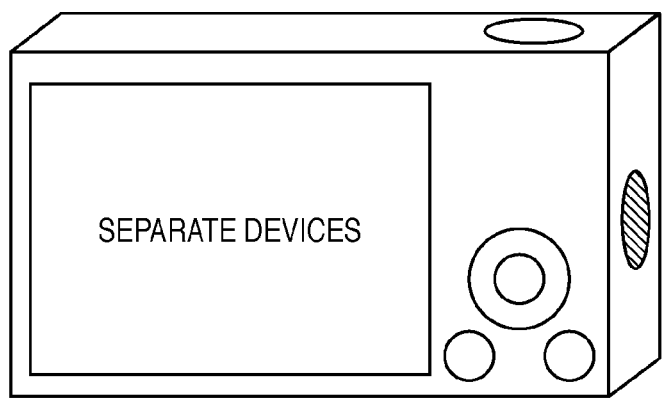
F I G. 8A
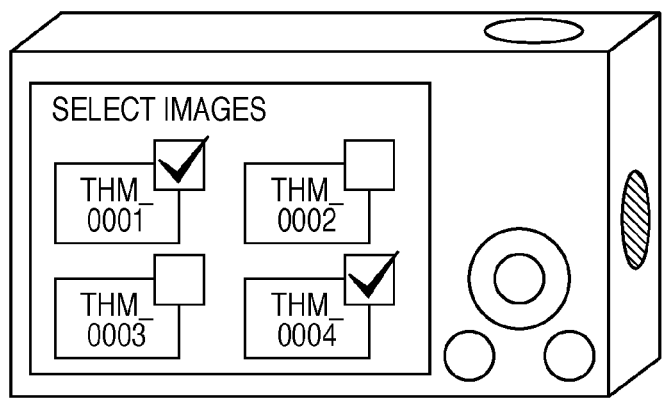
F I G. 8B
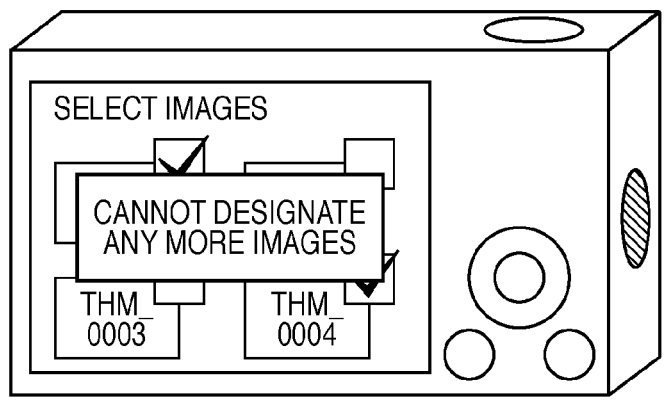
F I G. 8C
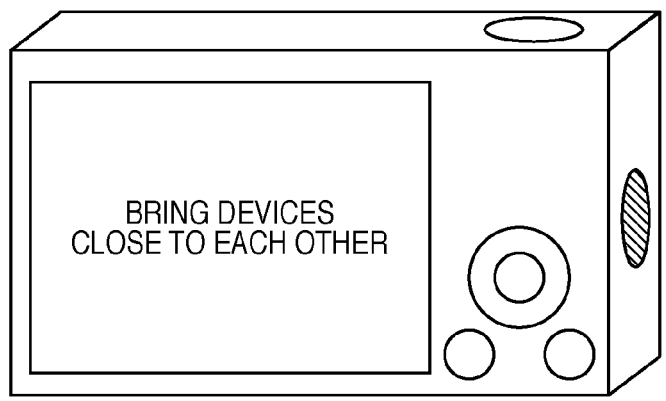
F I G. 8D

DATA RECEIVING APPARATUS, DATA TRANSMITTING APPARATUS, METHOD FOR CONTROLLING THE SAME AND PROGRAM

TECHNICAL FIELD

The present invention relates to a data supplying apparatus that supplies data to an external apparatus through close-proximity wireless communication and a method for controlling the same. Furthermore, the present invention relates to a data obtaining apparatus that obtains data from the aforementioned data supplying apparatus of the present invention through close-proximity wireless communication and a method for controlling the same.

BACKGROUND ART

In recent years, in addition to personal computers, some information devices such as digital still cameras (hereinafter, referred to as "digital cameras") transmit and receive data to/from each other through wireless communication. Examples of wireless communication between information devices include close-proximity wireless communication using NFC (Near Field Communication) technology typified by an IC tag or the like, and so on. Japanese Patent Laid-Open No. 2006-31531 is known as a document disclosing an information device that performs close-proximity wireless communication.

First, consider the case where data is transmitted and received between information devices. In this case, when an information device designates data stored in a partner device, and the data is transferred to the device itself, the information device obtains a list of data stored in the partner device. Then, data to be transferred is selected and designated from the obtained list, and thereby the designated data will be received. During the period between when the communication is established on obtaining the data list and when the designated data is received, communication between the devices in this case requires the established communication connection to be maintained. However, for example, when communication between devices is performed using close-proximity wireless communication as disclosed in the aforementioned document, the range in which communication is possible is restricted to be approximately several centimeters. Accordingly, when a device designates data stored in a partner device, and the data is transferred to the device itself, it is difficult for a user to operate the device while maintaining the communication connection through close-proximity wireless communication.

DISCLOSURE OF INVENTION

The present invention was achieved in view of the problems with the stated conventional technology. The present invention provides a technique through which a data obtaining apparatus can perform an operation for selecting data to be transferred without maintaining a communication connection through close-proximity wireless communication, in the context of a data obtaining apparatus that obtains data from the data supplying apparatus through close-proximity wireless communication and the method for controlling the same.

According to first aspect of the invention, there is provided a data receiving apparatus comprising: a communication unit that communicates with a data transmitting apparatus through close-proximity wireless communication; a detecting unit that detects the state of a connection to the data transmitting apparatus; wherein the communication unit that receives, from the data transmitting apparatus, index information indicating a list of data stored in a storage medium of the data transmitting apparatus if the detecting unit detects that a first connection has been established with the data transmitting apparatus via the communication unit, and a designation unit that receives a designation of data to be received from the data transmitting apparatus based on the index information after receiving the index information; wherein the communication unit that receives, from the data transmitting apparatus, data designated by the designation unit if a second connection is established with the data transmitting apparatus via the communication unit, after the designation unit has received the designation of data and after the detecting unit has detected the termination of the first connection.

According to second aspect of the invention, there is provided a data transmitting apparatus comprising: a communication unit that communicates with a data receiving apparatus through close-proximity wireless communication; and a detecting unit that detects the state of a connection to the data receiving apparatus; wherein the communication unit that transmits, to the data receiving apparatus, index information indicating a list of data stored in a storage medium of the data transmitting apparatus if the detecting unit detects that a first connection has been established with the data receiving apparatus via the communication unit, and wherein the communication unit transmits, to the data receiving apparatus, data selected by the data receiving apparatus based on the index information if a second connection is established with the data receiving apparatus via the communication unit, after the index information has been transmitted and after the detecting unit has detected the termination of the first connection.

According to third aspect of the invention, there is provided a method for controlling a data receiving apparatus having a communication unit that performs close-proximity wireless communication, the method comprising: detecting a state of connection to the data transmitting apparatus via the communication unit; receiving, from the data transmitting apparatus via the communication unit, index information indicating a list of data stored in a storage medium of the data transmitting apparatus if it is detected that a first connection has been established with the data transmitting apparatus via the communication unit; receiving a designation of data to be received from the data transmitting apparatus based on the index information after receiving the index information; and receiving, from the data transmitting apparatus, the designated data via the communication unit if a second connection is established with the data transmitting apparatus via the communication unit, after the designation of data has been received and after the termination of the first connection has been detected.

According to fourth aspect of the invention, there is provided a method for controlling a data transmitting apparatus having a communication unit that performs close-proximity wireless communication, the method comprising: detecting the state of a connection to the data receiving apparatus via the communication unit; and transmitting, to the data receiving apparatus via the communication unit, index information indicating a list of data stored in a storage medium of the data transmitting apparatus if it is detected that first connection has been established with the data receiving apparatus via the communication unit; and transmitting, to the data receiving apparatus via the communication unit, data selected by the data receiving apparatus based on the index information if a second connection is established with the data receiving apparatus via the communication unit, after the index information has been transmitted and after the termination of the first connection has been detected.

According to the present invention, the data obtaining apparatus can accept an operation for selecting data to be transferred without maintaining a communication connection through close-proximity wireless communication.

Further features of the present invention will become apparent from the following description of exemplary embodiments with reference to the attached drawings.

BRIEF DESCRIPTION OF DRAWINGS

FIGS. 8A to 8D are diagrams showing exemplary messages displayed on an image displaying unit of a digital camera.

BEST MODE FOR CARRYING OUT THE INVENTION

Hereinafter, exemplary embodiments of this invention will be described with reference to the drawings. Although the exemplary embodiments of this invention show the most preferable embodiments of the invention, the scope of this invention is not limited by the description of the following exemplary embodiments.

Figure 1:
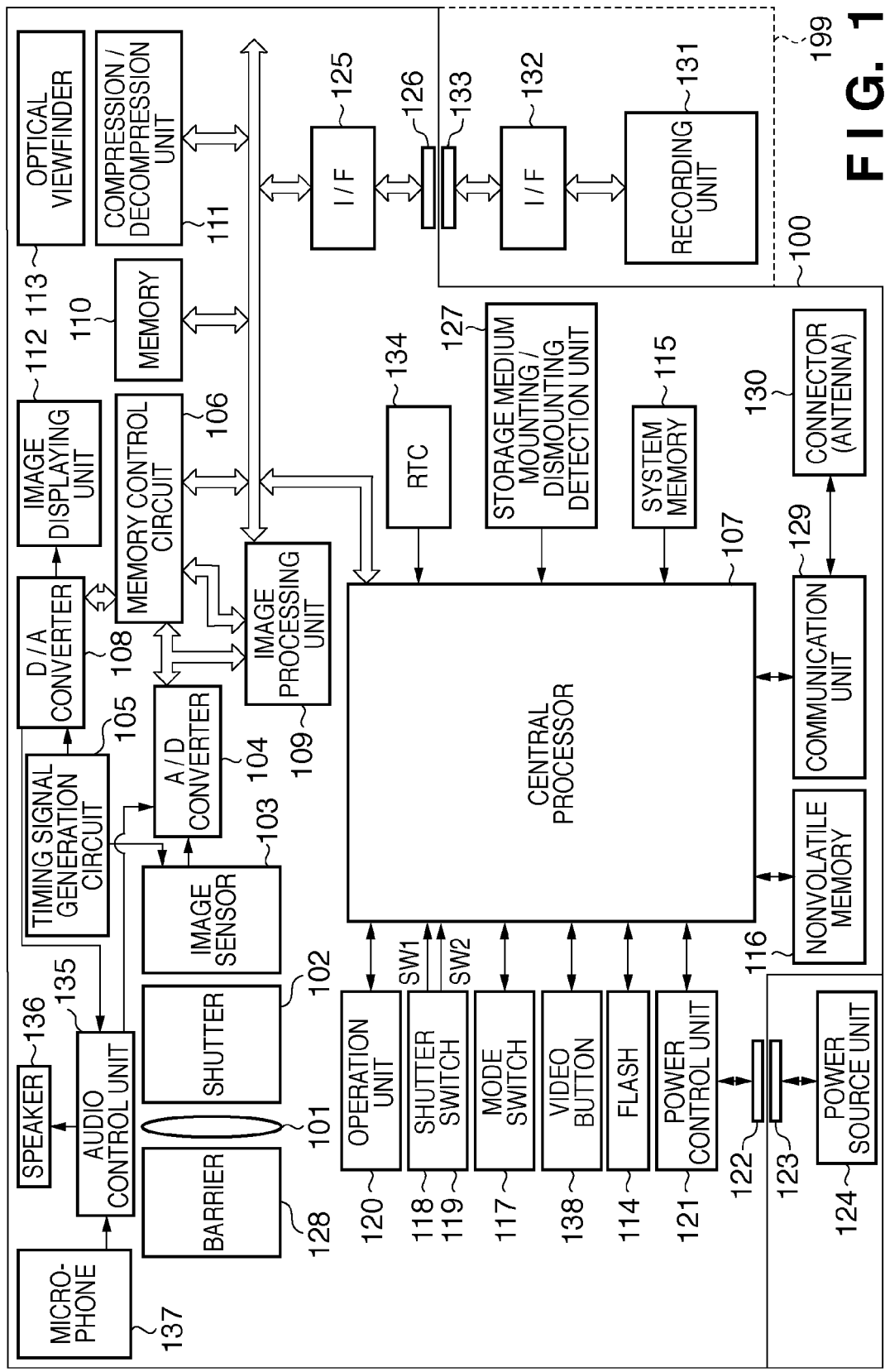
FIG. 1 is a block diagram showing the configuration of a digital camera according to an exemplary embodiment.

In the following description, an exemplary case where both a data supplying apparatus that supplies data to an external apparatus through close-proximity wireless communication and a data obtaining apparatus that obtains data from the data supplying apparatus through close-proximity wireless communication are digital cameras will be described. FIG. 1 is a block diagram showing the configuration of a digital camera 100 according to the present exemplary embodiment.

It should be noted that "close-proximity wireless communication" in this specification refers to wireless communication based on a communication protocol specified assuming the communication range to be less than one meter, and in particular less than several tens of centimeters. A "vicinity" contactless communication protocol for a communication range of approximately 70 cm or less and a "proximity" contactless communication protocol for a communication range of approximately 10 cm or less are known as such a communication protocol. Specifically, there are standards such as ISO/IEC 15693, ISO/IEC 14434 and ECMA-340 (ISO/IEC 18092).

As shown in FIG. 1, in the digital camera 100, an optical image is formed in an image sensor 103 via an imaging lens 101 and a shutter 102 including a function for adjusting the aperture. The image sensor 103 converts a formed optical image into an electrical signal and outputs an analog signal. Note that a well-known sensor such as a CCD or CMOS image sensor may be used for the image sensor 103. An A/D converter 104 converts an analog signal outputted by the image sensor 103 into digital data.

A timing signal generation circuit 105 is controlled by a memory control circuit 106 and a central processor 107, and supplies a clock signal and a control signal to the image sensor 103, the A/D converter 104, and a D/A converter 108. An image processing unit 109 performs predetermined pixel interpolation processing and color conversion processing on digital data from the A/D converter 104 or data supplied by the memory control circuit 106. Further, the image processing unit 109 performs predetermined computational processing using shot image data, and supplies the computational result to the central processor 107. Also, the image processing unit 109 performs predetermined computational processing using shot image data and realizes TTL (through-the-lens) AWB (auto white balance) processing based on the obtained computational result.

The central processor 107 performs TTL AF (auto focus) and AE (auto exposure), base on the arithmetic result obtained by the image processing unit 109, by controlling the A/D converter 104, the position of the imaging lens 101, and the aperture of the shutter 102. Similarly, the central processor 107 realizes TTL EF (electronic flash pre-emission) processing, based on the computational result obtained by the image processing unit 109, by controlling a flash 114.

The memory control circuit 106 controls the A/D converter 104, the timing signal generation circuit 105, the image processing unit 109, the D/A converter 108, a memory 110, a compression/decompression unit 111, and the like. Digital data from the A/D converter 104 is written into the memory 110 (or an image display memory that is separately provided) as image data via the image processing unit 109 and the memory control circuit 106, or directly via the memory control circuit 106.

The image data written in the memory 110 is displayed on an image displaying unit 112 via the D/A converter 108. The image displaying unit 112 is configured of, for example, an LCD using a TFT or the like. Note that the digital camera 100 can realize an EVF (electronic viewfinder) function if shot image data is successively displayed on the image displaying unit 112. Also, the image displaying unit 112 can turn the display ON/OFF in accordance with an instruction from the central processor 107. When the display of the image displaying unit 112 is turned OFF, the power consumption of the digital camera 100 can be greatly reduced. Therefore, when a user performs image shooting using an optical viewfinder 113, power can be saved by turning the display OFF in accordance with an operation instruction from an operation unit 120.

The memory 110 stores still image data and video data (moving image data) obtained by image shooting. The memory 110 is provided with a storage capacity sufficient for storing a predetermined number of pieces of still image data and a predetermined amount of video data. The digital camera 100 can thereby write a large volume of image data into the memory 110 at high speed, even in the case of continuous shooting whereby a plurality of still images are taken sequentially, or in the case of panorama shooting. Furthermore, the memory 110 is used as a work area for the central processor 107.

The compression/decompression unit 111 compresses image data (encodes data) or decompresses image data (decodes data) using an ADCT (adaptive discrete cosine transform) or the like. For example, the image compression/decompression unit 111 reads image data stored in the memory 110, performs compression processing or decompression processing on the read image data, and writes the data that has been processed into the memory 110.

An audio control unit 135 receives, under the control of the central processor 107, audio data converted into an analog signal by the D/A converter 108, and controls audio output from a speaker 136 via an amplification circuit (not specifically shown). Also, the audio control unit 135, under the control of the central processor 107, controls audio input to be outputted to the A/D converter 104 after analog signal audio data outputted from a microphone 137 has passed through an amplification circuit.

An exposure control unit (not shown) controls the shutter 102, under the control of the central processor 107. For example, the exposure control unit performs flash brightness control by controlling the shutter 102 in conjunction with the flash 114. A focusing control unit (not shown) controls the focusing of the imaging lens 101, under the control of the central processor 107. Specifically, the focusing control unit performs drive control regarding the position of a focusing lens of the imaging lens 101. For example, when using the TTL system, based on the arithmetic result obtained by the image processing unit 109 through calculation using shot image data, the central processor 107 controls the exposure control unit and the focusing control unit. A zoom control unit (not shown) controls zooming of the imaging lens 101, under the control of the central processor 107. Specifically, the zoom control unit performs drive control regarding the position of a zoom lens of the imaging lens 101. A barrier control unit (not shown) controls the opening/closing of a barrier 128, which protects the imaging lens 101 using a cover member (barrier), under the control of the central processor 107.

The central processor 107 performs central control of the entire digital camera 100. Specifically, the central processor 107 reads out program data stored in a system memory 115, expands the read data in a work area of the memory 110, and performs overall control of operations performed by the digital camera 100 in cooperation with the expanded program data.

The optical viewfinder 113 is provided between the imaging lens 101 and the image sensor 103, and projects incident light from the imaging lens 101 on a screen using a mirror that springs up when exposing the image sensor 103 or a pentaprism, and optically displays a subject image. The digital camera 100 can shoot images using the optical viewfinder 113, without using an electronic viewfinder function provided by image displaying unit 112. Part of the aforementioned image displaying unit 112 may be provided in the optical viewfinder 113.

The flash 114 irradiates a subject with fill-in light by emitting light under the control of the central processor 107. The flash 114 may have a flooding-light function for irradiating fill-in light onto a subject when performing AF, a flash brightness control function for adjusting the amount of light with which the subject is to be irradiated, and the like.

The system memory 115 stores constants, variables, program data, and the like used for the operation of the central processor 107. The system memory 115 also stores therein program diagrams used when performing AE. Note that the program diagrams are data pieces referred to when performing TTL-AE and table data pieces that predefine control values such as aperture sizes and shutter speeds for a computational result (for example, a luminance value) obtained by the image processing unit 109.

The digital camera 100 presents to a user operational states, messages and the like using text, images, audio, and the like through the central processor 107 controlling the image displaying unit 112 and the audio control unit 135 in accordance with the execution of program data by the central processor 107. A constituent element (the image displaying unit 112 or the speaker 136) for presenting the above information to the user is disposed in an easily recognizable position, such as in the vicinity of the operation unit 120 of the digital camera 100. Note that part of the image displaying unit 112 is also provided in the optical viewfinder 113, and some of the information is presented on the image displaying unit 112 provided in the optical viewfinder 113. After presenting operational states, messages, and the like to the user through the image displaying unit 112 or the speaker 136 under the control of the central processor 107, the digital camera 100 accepts an operation from the operation unit 120 and the like. For example, when designating data to be transferred from an external device (described later), the functionality of a designation means is realized by displaying a screen for designating data on the image displaying unit 112 and receiving user designation from the operation unit 120.

Among content to be displayed on the image displaying unit 112, operational states regarding shooting images and operational states regarding operations other than shooting images are displayed on the LCD or the like, outside of the screen for designating data to be transferred. For example, display of operational states regarding shooting images includes a single shot/continuous shooting display, a self-timer display, a compression rate display, a display showing the number of recorded pixels, a display showing the number of recorded images, a display showing the remaining number of images that can be shot, a shutter speed display, an aperture value display, an exposure correction display, and the like. Furthermore, a flash display, a red-eye reduction display, a macro shooting display, and the like may be included. Display of operational states regarding operations other than shooting images includes a buzzer setting display, a display showing the remaining battery power for a clock, a display showing the remaining battery power, an error display, a multi-digit number information display, a display showing the mounting state of a storage medium 199, a display showing the operation of a communication I/F, a date and time display, and the like. Meanwhile, among the content to be displayed on the image displaying unit 112, a focus display, a camera shake warning display, a flash charge display, a shutter speed display, an aperture value display, an exposure display, and the like are displayed in the optical viewfinder 113.

A nonvolatile memory 116 is a memory that can be electrically erased and recorded, and may be, for example, an EEPROM (Electrically Erasable and Programmable ROM) or the like.

A mode switch 117 is a switch for a user to make settings for switching between functional modes, such as power OFF, an automatic shooting mode, a shooting mode, a panoramic shooting mode, a playback mode, a multi-screen playback/erasing mode, a PC connection mode, and the like.

A first shutter switch 118 (SW1) is a switch that is turned ON when a shutter button (not shown) is pressed partway (for example, a state where the button is pressed halfway). The central processor 107 starts processing operations such as AF, AE, AWB, EF, and the like when the first shutter switch 118 is turned ON.

A second shutter switch 119 (SW2) is a switch that is turned ON when an operation of the shutter button is completed (for example, a state where the button is fully pressed). The central processor 107 executes a series of operations for shooting, or in other words, an exposure process, a development process, and a recording process, when the second shutter switch 119 is turned ON. In the exposure process, a signal (an analog signal) read out from the image sensor 103 is written into the memory 110 as digital data via the A/D converter 104 and the memory control circuit 106. In the development process, the image processing unit 109 and the memory control circuit 106 perform image processing on the digital data written into the memory 110, and the digital data on which the image processing has performed is then written into the memory 110. In the recording process, the digital data written into the memory 110 after having gone through the development process is read out, compressed by the compression/decompression unit 111, and then written into the storage medium 199.

The operation unit 120 is made up of various buttons, a touch panel and the like. Specifically, the buttons include a menu button for displaying various setting menus and making settings, a menu shift button, a set button and the like. For example, when designating data to be transferred from the external device (described later), such data is selected from a plurality of candidate data pieces using the menu shift button or the like, and data designated using the set button is designated as data to be transferred. Further, various setting buttons used when shooting images include a macro button, a flash settings button, a single shot/continuous shot/self timer switch button, an exposure correction button, a shooting image quality selection button, and the like. The setting buttons also include a multi-screen playback page break button for playing back the shot image and making a setting for selecting an image to be outputted, a playback image shift button, a date/time setting button for setting a date and the like, and so on.

The digital camera 100 includes a video button 138 for accepting, from a user, instructions indicating the starting and stopping of video shooting. In the digital camera 100, pressing the video button 138 when a video is not being shot starts the video shooting, whereas pressing the video button 138 when a video is being shot stops the video shooting. Also, the digital camera 100 may include a user interface for setting WB (white balance) operations for still image shooting during video shooting. Note that one mode may be selected from three types of modes such as a color reproduction priority mode, a video priority mode, and a still image priority mode when setting WB operations for still image shooting during video shooting.

A power control unit 121 is configured of a battery detection circuit, a DC-DC converter, switch circuits for switching blocks to be energized, and the like (none of them are shown). The power control unit 121 detects the battery connection, voltage outputted by the battery, and the like, controls the supply of power to units of the digital camera 100, and the like under the control of the central processor 107. Connectors 122 and 123 connect the power control unit 121 to a power source unit 124. Primary batteries such as alkali batteries and lithium batteries, secondary batteries such as NiCd batteries, NiMH batteries, Li batteries, and an AC adapter or the like can be used as the power source unit 124, which supplies electrical power to the digital camera 100.

An I/F 125 connects the storage medium 199 connected via a connector 126 to an internal bus so as to enable communication. The connector 126 is a connector that is electrically and physically connected to the storage medium 199 and enables communication between the storage medium 199 and the I/F 125. A storage medium mounting/dismounting detection unit 127 is configured of a switch or the like for detecting physical connection between the connector 126 and the storage medium 199, detects whether or not the storage medium 199 is mounted to the connector 126, and outputs the detection signal to the central processor 107.

Note that in the present exemplary embodiment, the storage medium 199 is described as having one interface/connector system. Of course, there may be any number of interface/connector systems for mounting the storage medium 199, whether one or a plurality. Furthermore, the configuration may provide combinations of interfaces and connectors of different standards. It is possible to use interfaces and connectors that comply with the standards for PCMCIA cards, CF (CompactFlash®) cards and the like. Moreover, mounting a communication card to the connector 126 makes it possible to exchange image data and management information attached to the image data with peripheral devices such as other computers, printers and the like. For example, examples of communication cards include LAN cards, modem cards, USB cards, IEEE 1394 cards, P1284 cards, SCSI cards, and PHS data communication cards.

The barrier 128 prevents the imaging unit including the imaging lens 101 of the digital camera 100 from being soiled or damaged by covering that imaging unit.

A communication unit 129 performs data transmission/reception to/from an external device through serial/parallel communication in a wired/wireless manner by using RS232C, USB, IEEE 1394, P1284, SCSI, a modem, a LAN, wireless communication, or the like. A connector (antenna) 130 connects the digital camera 100 to another device (external device) via the communication unit 129, and is a connector in the case where the connection type is wired or an antenna in the case where the connection type is wireless.

An RTC (Real Time Clock) 134 outputs time information under the control of the central processor 107. Note that the RTC 134 has an internal power supply that is separate from the power control unit 121, and can keep time even when power is not supplied by the power source unit 124.

The storage medium 199 is a memory card, a hard disk drive, or the like that is mountable/removable to/from the digital camera 100 via the connector 126. The storage medium 199 includes a storage unit 131 configured of a semiconductor memory, a magnetic disk, or the like, an I/F 132 between the storage unit 131 and the digital camera 100, and the connector 133 for electrically and physically connecting the storage medium 199 to the digital camera 100 via the connector 126. Note that although the storage medium 199 is described as a storage medium that is mountable/removable to/from the digital camera 100 via the connector 126 in the present exemplary embodiment, this storage medium may instead be fixed internally in the digital camera 100.

Note that the central processor 107 of the digital camera 100 may be one hardware piece or may be configured of a plurality of hardware pieces that cooperate so as to realize a function as the one central processor 107. Data, such as image data shot by the image sensor 103, that is to be supplied to an external apparatus is assumed to be pre-stored in the storage unit 131 of the storage medium 199. Further, program data for controlling the digital camera 100 is stored in the nonvolatile memory 116, executed, and expanded in the memory 110, and then the expanded program data is executed by the central processor 107. Program data is executed by the central processor 107, and thereby the digital camera 100 loads image data stored in the storage unit 131, and plays back and displays the data on the image displaying unit 112. Also, the digital camera 100 performs processing (described later) so as to supply image data stored in the storage unit 131 to an external device connected via the communication unit 129, obtain designated image data from the external device, or the like.

Figure 2:
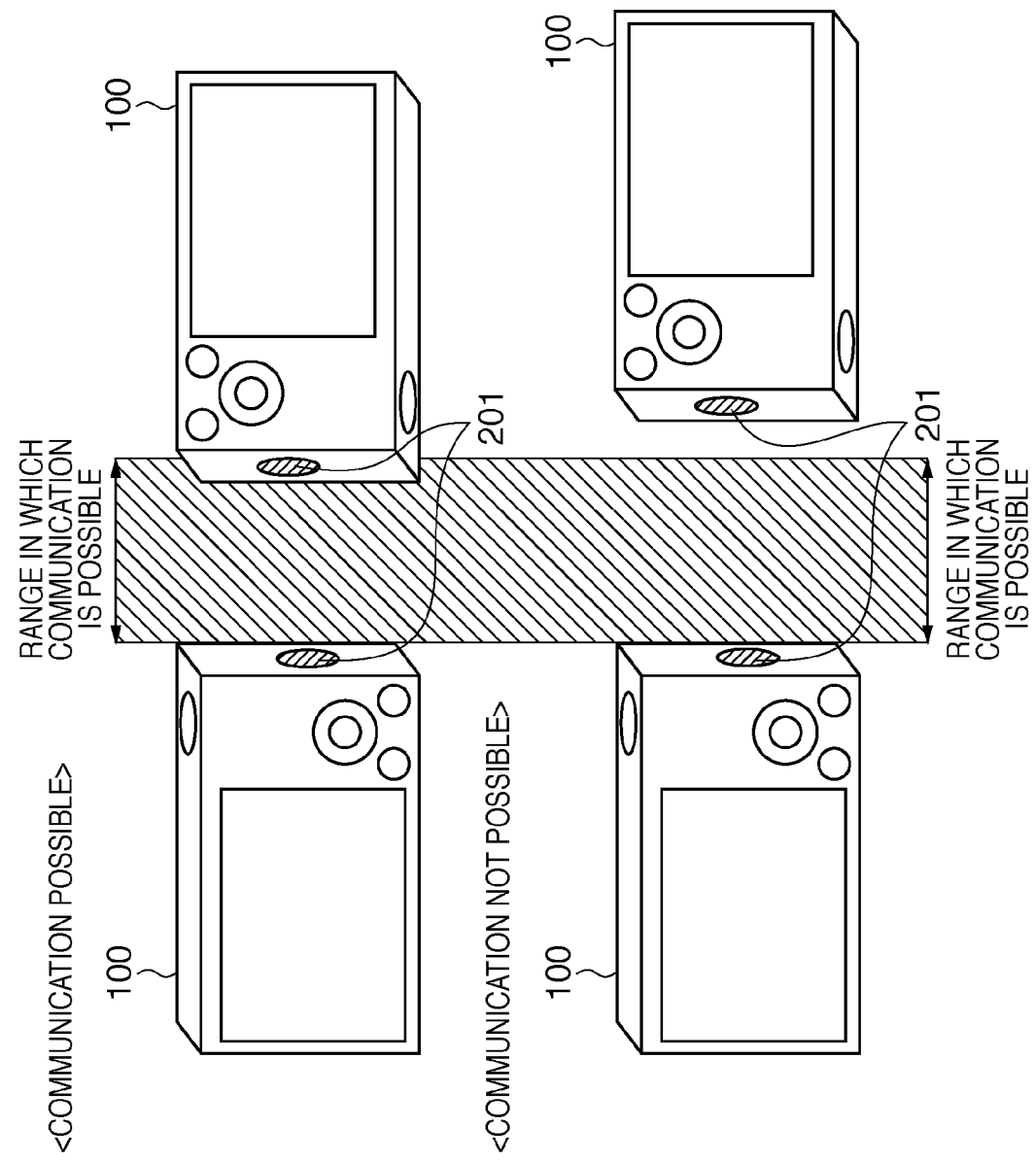
FIG. 2 is a conceptual diagram illustrating close-proximity wireless communication performed by digital cameras.

Note that in the present exemplary embodiment, the digital camera 100 is provided with a transmission/reception unit 201 as shown in FIG. 2 as an example of the communication unit 129. The transmission/reception unit 201 is provided on the lateral side of the digital camera 100 and performs close-proximity wireless communication using NFC technology with an external device. As shown in FIG. 2, if both the transmission/reception units 201 are in the range in which close-proximity wireless communication is possible, the digital cameras 100 start communication so as to be communicatively connected. Meanwhile, if both the transmission/reception units 201 are not in the range in which close-proximity wireless communication is possible, communication is not started. Further, when both the transmission/reception units 201 are in the range in which close-proximity wireless communication is possible and the digital cameras 100 are communicatively connected, if both the transmission/reception units 201 are then separated and moved out of the range in which close-proximity wireless communication is possible, the communication connection is cancelled.

Although a digital camera capable of shooting a video is applied in the description of the present exemplary embodiment, a digital single-lens reflex camera, a digital camcorder, or the like may be applied rather than the above camera. Moreover, a mobile phone or what is called an image viewer that displays image data may also be applied.

Figure 3:
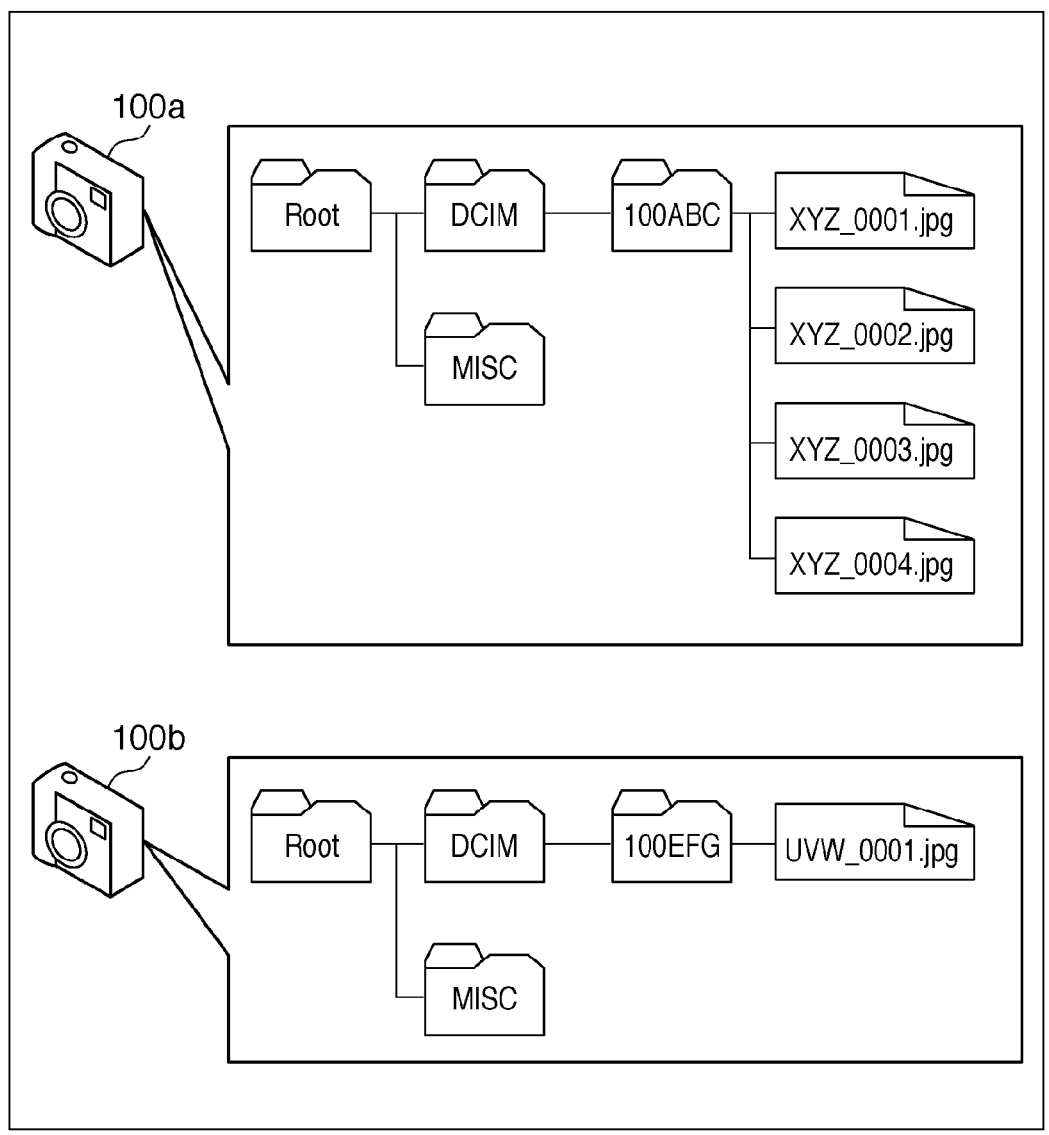
FIG. 3 is a conceptual diagram illustrating directory configurations of two digital cameras according to an exemplary embodiment.

Next, processing performed by the digital camera 100 in the present exemplary embodiment will be described. First, data storage conditions of two digital cameras having a close-proximity wireless communication function will be described, which is assumed when describing processing performed by the digital camera 100. FIG. 3 is a conceptual diagram illustrating directory structures of digital cameras 100a and 100b. The digital cameras 100a and 100b as shown in FIG. 3 have the same configuration as that of the digital camera 100 described with reference to FIGS. 1 and 2. Storage units 131 of the digital cameras 100a and 100b store therein image files in accordance with a folder configuration compliant with DCF standard. Note that DCF standard is a well-known axiomatic standard; thus, description thereof shall be omitted here.

As shown in FIG. 3, four image files, XYZ_0001.jpg, XYZ_0002.jpg, XYZ_0003.jpg, and YXZ_0004.jpg, are stored in the digital camera 100a. Meanwhile, an image file, UVW_0001.jpg, is stored in the digital camera 100b. Note that although an image file used in the present exemplary embodiment is generated in a format compliant with Exif-JPEG, the image file may be generated as a RAW image file or a video file, other than the above format. Note that Exif standard is a well-known axiomatic standard; thus, a description thereof shall be omitted here.

In the present exemplary embodiment, in order to give descriptions in an easily comprehensible manner, descriptions will be given assuming that a data supplying apparatus, that is, an apparatus that finally transmits an image file through close-proximity wireless communication, is the digital camera 100a. Meanwhile, descriptions will be given assuming that a data obtaining apparatus, that is, an apparatus that ultimately receives image data through close-proximity wireless communication, is the digital camera 100b.

Details of Processing Performed by Digital Camera 100b, Which Obtains Data

Figure 4:
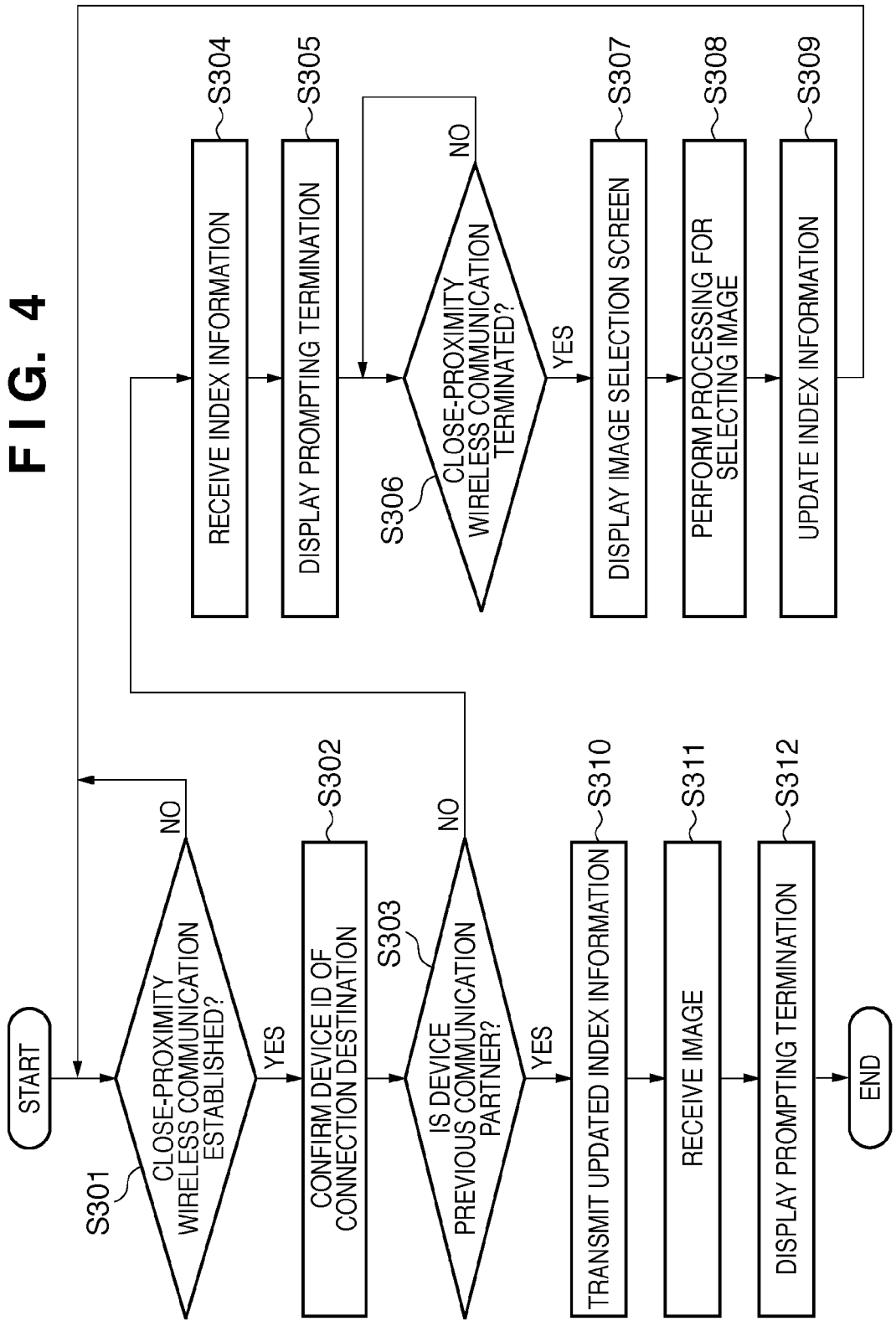
FIG. 4 is a flowchart showing processing performed by a digital camera that obtains data through close-proximity wireless communication.

First, processing performed by a central processor 107 of the digital camera 100b will be described with reference to FIG. 4. As shown in FIG. 4, in step S301, the central processor 107 performs processing for detecting whether close-proximity wireless communication with the digital camera 100a, which is an external device, has been established. As shown in FIG. 2, if transmission/reception units 201 of the digital cameras 100a and 100b enter the range in which communication is possible, close-proximity wireless communication is automatically established (communicatively connected) without a user performing a specific operation. For example, detection of communication connection through close-proximity wireless communication in step S301 is performed based on a detection signal outputted from a communication unit 129 to the central processor 107 in accordance with reception by a connector (antenna) 130 and so on as disclosed in Japanese Patent Laid-Open No. 2006-31531.

If communication connection with an external device through close-proximity wireless communication is detected in step S301, that is, if close-proximity wireless communication is established by the digital cameras 100a and 100b approaching each other, the central processor 107 advances the processing to step S302. The processing in step S301 is repeatedly performed until close-proximity wireless communication with an external device is detected.

In step S302, the central processor 107 performs processing for obtaining the device ID of the communication partner. The digital cameras 100a and 100b are respectively assigned a unique ID (identification information) in advance, and it is possible to use the ID as information specifying a communication partner. In the present exemplary embodiment, the identification information specifying each device is referred to as a device ID. A device ID is stored in, for example, a nonvolatile memory 116 used as a storage means. In this step, if close-proximity wireless communication is established between apparatuses, the apparatuses transmit and receive each other's device ID, hold the device ID of their communication partner in a memory 110, or store the ID in the storage unit 131. Note that if communication has already been performed a plurality of times, it is assumed that the storage unit 131 of the digital camera 100b holds the device ID of the previous (latest) communication partner. In the present exemplary embodiment, after close-proximity wireless communication has been established between the digital cameras 100a and 100b, it is assumed that the digital camera 100a obtains and holds the device ID of the digital camera 100b, and the digital camera 100b obtains and holds the device ID of the digital camera 100a.

In step S303, the central processor 107 determines whether or not the communication partner with which communication has established this time is the external device with which communication was performed last time, or in other words, the external device with which communication had been performed before communication was established in step S301. In step S303, since a device ID of the external device with which communication was performed last time and a device ID of the external device with which communication was established in step S301 this time are held as described in step S302, both the device IDs are compared. If the device IDs match, the central processor 107 determines that this is the second communication, and the processing proceeds to step S310. Meanwhile, if the device ID of the external device with which communication is performed this time does not match the device ID of the external device with which communication was performed last time, or is not the same as the device ID of the external device with which communication was performed before so that this is the first communication, the central processor 107 advances the processing to step S304.

First, step S304 and the steps thereafter will be described assuming that the digital cameras 100a and 100b are communicating for the first time. In step S304, the central processor 107 obtains index information through close-proximity wireless communication from the digital camera 100a, which is an external device. In this step, information necessary for designating an image file to be transferred, that is, index information indicating image data stored in the external device is obtained. Index information in the present exemplary embodiment includes a file path, a file size, and thumbnail data of an image stored in the digital camera 100a. Note that it is also possible to add information on the status of the digital camera 100a, information obtained from the image file content or information obtained from additional information (for example, gradation information or Exif information) to the index information, depending on the content to be processed.

The index information is generated through processing (described later) performed by the digital camera 100a and transmitted to the digital camera 100b. Note that the index information may be partially formatted as a text file. Thumbnail data of the image is obtained from a header of the image file stored in the digital camera 100a.

Figure 5:
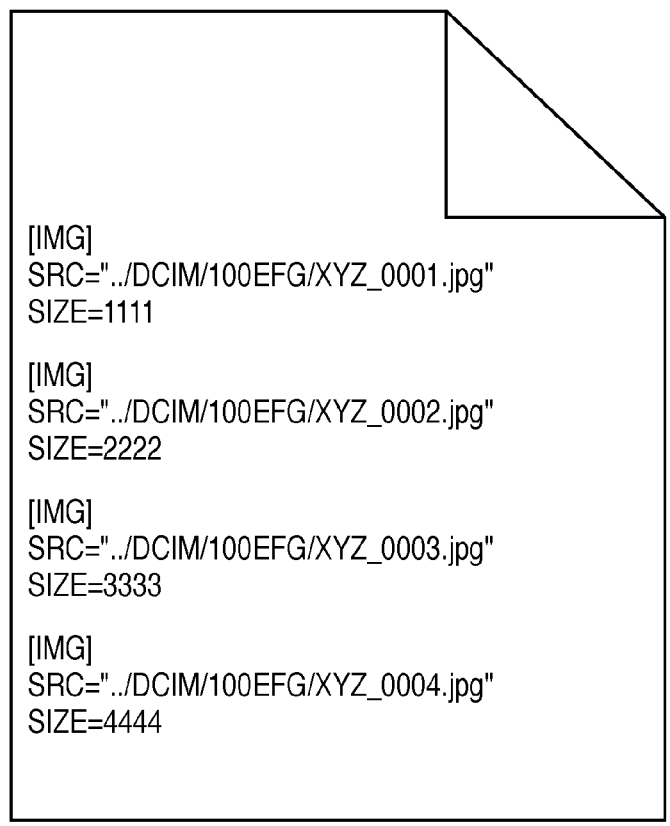
FIG. 5 is a conceptual diagram showing an example of index information.

FIG. 5 is a conceptual diagram showing an example of index information. In the index information as shown in FIG. 5, the image file paths and the image file sizes are recorded in a text format. Note that the example as shown in FIG. 5 is index information for image information (a file path and a file size of an image) stored in the digital camera 100a and illustrated in the aforementioned FIG. 3. The digital camera 100a transmits a text file including the index information and thumbnail data obtained from an image file to the digital camera 100b in the processing described later.

Meanwhile, the central processor 107 of the digital camera 100b receives the text file including the index information and the thumbnail data obtained from the image file in step S304 and temporarily stores the data in the storage unit 131 or the like. Specifically, as shown in FIG. 6, the thumbnail data and the text data including the index information are stored in a format compliant with the DCF standard in the storage unit 131.

Figure 6:
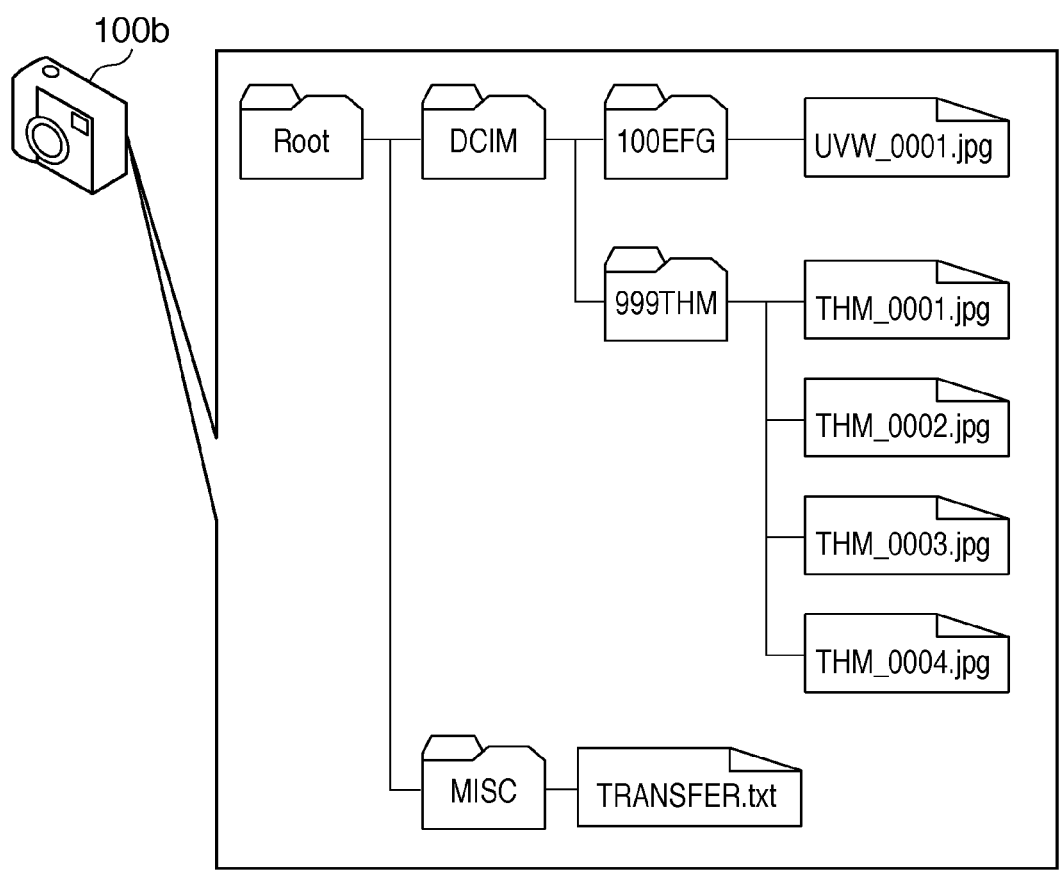
FIG. 6 is a conceptual diagram illustrating a directory configuration of a digital camera.
Figure 7:
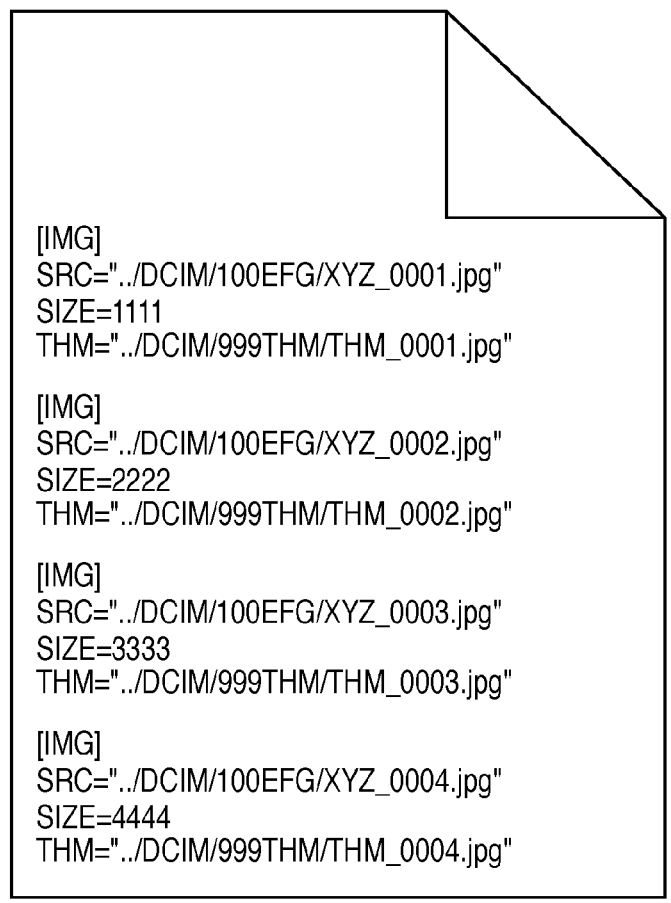
FIG. 7 is a conceptual diagram illustrating a text file including index information to be stored in the digital camera.

As shown in FIG. 6, in the present exemplary embodiment, the "999THM" folder is generated under the "DCIM" directory in the digital camera 100b on the receiving side. Further, the thumbnail data is stored as an image file under the generated "999THM" folder (THM_0001.jpg to THM_0004.jpg). Moreover, the text file including the index information is stored in the TRANSFER.txt format in the "MISC" folder. Note that when data is stored, a path indicating where the image file including the thumbnail image is stored is added to the text file including the index information as shown in FIG. 7. For example, in the text file as illustrated in FIG. 7, a file path for the thumbnail image of XYZ_0001.jpg in the digital camera 100a is represented as ". . ./DCIM/999THM/THM_0001.jpg" and added.

In step S305, after the processing in step S304 is completed, that is, the index information has been obtained, the central processor 107 performs notification processing for prompting the termination of communication connection to the digital camera 100a through close-proximity wireless communication. Specifically, in the notification processing, a message that prompts the termination is displayed on an image displaying unit 112. Note that in the notification processing, audio may be outputted from the speaker 136 or the like to prompt the termination. For example, as shown in FIG. 8A, a message that prompts cancellation of the communication connection by separating the apparatuses from each other is displayed on the image displaying unit 112. By performing the notification processing, it is possible to prompt a user operating the digital camera 100b to cancel communication connection through close-proximity wireless communication. Note that in order to cancel communication connection, it is sufficient to bring the apparatuses out of the range in which communication is possible, as shown in FIG. 2.

Next, in step S306, the central processor 107 performs processing for detecting whether or not communication connection to the external device through close-proximity wireless communication is terminated. This termination detection is performed similarly to the aforementioned case of detecting communication connection in step S301 and is performed, for example, based on a detection signal outputted from the communication unit 129 to the central processor 107 in accordance with reception by the connector (antenna) 130. If termination of the communication is detected, the central processor 107 makes the processing proceed to step S307. Meanwhile, the processing in step S306 is repeatedly performed until termination of communication with the external device is detected.

In step S307, in order to designate an image file to be transferred, the central processor 107 performs processing for displaying, on the image displaying unit 112, a list of image files that are transfer candidates based on the index information, and a designation screen that enables the user to select an image file via an operation unit 120. In this step, the central processor 107 of the digital camera 100b analyzes the index information stored in step S304, plays back the thumbnail image file, displays thumbnails, and generates a selection screen for designating an image to be transferred. A program for displaying the selection screen or a program for a user interface for accepting a selection instruction using the selection screen are pre-stored in the nonvolatile memory 116. When the processing in this step is started, the aforementioned programs stored in the nonvolatile memory 116 are automatically loaded in sequence, and a user interface that is a selection screen is displayed on the image displaying unit 112.

The thumbnails are displayed in predetermined positions of the aforementioned selection screen (for example, positions based on the order of arrangement, such as the order of data or the order of data size). For example, as shown in FIG. 8B, four thumbnail images included in the text file including the index information stored in step S304 are displayed on the image displaying unit 112 due to execution of a program for a screen for selecting an image. Such a selection screen is not displayed while the digital cameras 100a and 100b are communicatively connected, and is displayed only after the communication connection is terminated. The following is the reason why such procedure is taken. That is, if a selection screen is displayed in the communicatively connected state, the user may attempt to perform a selection operation, with the device being close to the communication partner device. In view of this, the digital camera 100b displays a screen that prompts termination while the cameras are communicatively connected and displays a selection screen only after the communication connection is terminated.

In step S308, the central processor 107 performs processing for designating an image to be transferred (received). Specifically, in step S308, the operation unit 120 accepts an operation instruction from a user who viewed a selection screen displayed on the image displaying unit 112 in step S307, thereby receiving the user designation of an image to be transferred. As shown in FIG. 8B, checkbox controls (hereinafter, referred to as "checkboxes") are disposed on each image on the selection screen. In order to designate an image to be transferred, a check mark is placed in the checkbox by operating the operation unit 120. For example, in the example shown in FIG. 8B, "THM_0001" and "THM_0004" are designated as images to be transferred.

Note that in the present exemplary embodiment, the file size of an image is included in the index information, and the central processor 107 adds the file size of the image whose checkbox is placed with a check mark based on the index information. If the added value exceeds space capacity of the storage unit 131 of the digital camera 100b, it is impossible to obtain images from the digital camera 100a in this state. Accordingly, as shown in FIG. 8C, the central processor 107 displays, on the image displaying unit 112, a warning message indicating that an image to be transferred cannot be designated in order to restrict designation of an image.

In step S309, the central processor 107 performs processing for editing the index information, and the processing returns to step S301. Specifically, after the user operating the digital camera 100b completes designation of an image to be transferred, if the operation for notifying that designation has been completed, such as by pressing a set button of the operation unit 120, is performed, the text file including the index information is updated. Thereafter, as shown in FIG. 8D, a message that prompts the apparatuses to be brought close to each other is displayed on the image displaying unit 112 in step S309 in order to reestablish the communication connection through close-proximity wireless communication between the digital cameras 100a and 100b.

Figure 9:
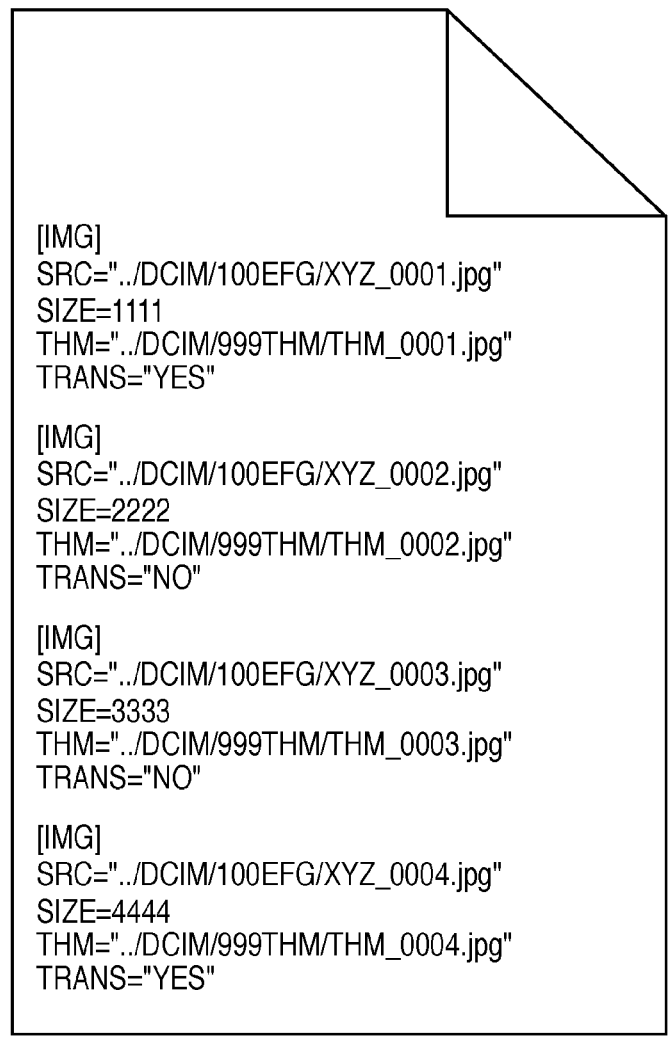
FIG. 9 is a conceptual diagram illustrating an updated text file.

When the text file including the index information is updated in step S309, information indicating whether or not the data is to be transferred is added as shown in FIG. 9. For example, when XYZ_0001.jpg and XYZ_0004.jpg are designated as image files to be transferred, "YES" is added to an item indicating whether or not the data is to be transferred (TRANS). Meanwhile, if the data is not designated as an image file to be transferred, "NO" is added thereto.

Next, the processing returns to step S301; the processing performed when the communication connection through close-proximity wireless communication between the digital cameras 100a and 100b is reestablished, or in other words, the processing in step S310 and the steps thereafter, will be described.

In step S310, the central processor 107 performs processing for transmitting the updated index information to the digital camera 100a, which is reconnected. In this step, the central processor 107 transmits the text file including the index information to the digital camera 100a. As described above, "YES" has been added to the image file to be transferred in the text file transmitted to the digital camera 100a. Accordingly, based on the text file, the digital camera 100a can transmit, to the digital camera 100b, the image file that has been designated as the file to be transferred by performing the later-described processing.

In step S311, the central processor 107 performs processing for receiving and obtaining the image data transmitted from the digital camera 100a, that is, the image data (image file) that has been designated based on the text file including the index information. In the aforementioned example shown in FIG. 9, XYZ_0001.jpg and XYZ_0004.jpg are transferred in this stated order from the digital camera 100a to the digital camera 100b.

Figure 10:
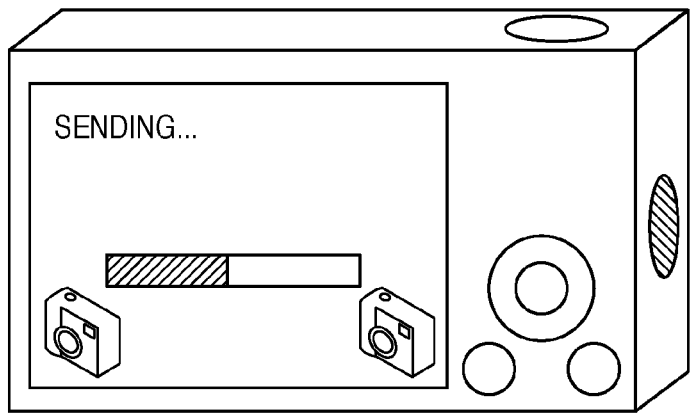
FIG. 10 is a conceptual diagram showing an example of the display of a message indicating that data is being transferred.

In step S311, the central processor 107 displays a message indicating that data is being transferred on the image displaying unit 112 of the digital camera 100b, as shown in FIG. 10. Note that if communication is terminated partway through the process, it is also possible to obtain the image data by the central processor 107 re-performing processing in step S310 and steps thereafter when the cameras next communicate.

In step S312, when the central processor 107 detects that all the image data pieces have been obtained in step S311, the central processor 107 stops displaying the message illustrated in FIG. 10 and performs notification processing for displaying, on the image displaying unit 112, a message that prompts cancellation of communication connection as illustrated in FIG. 8A. That is, the digital camera 100b can prompt the user operating the digital camera 100b to cancel the communication connection through close-proximity wireless communication by performing the notification processing after obtaining the designated data. Note that when the central processor 107 detects completion of obtaining the image data in step S311, the central processor 107 may automatically erase the received index information. By doing this, content in the storage unit 131 of the digital camera 100b can be erased.

Figure 11:
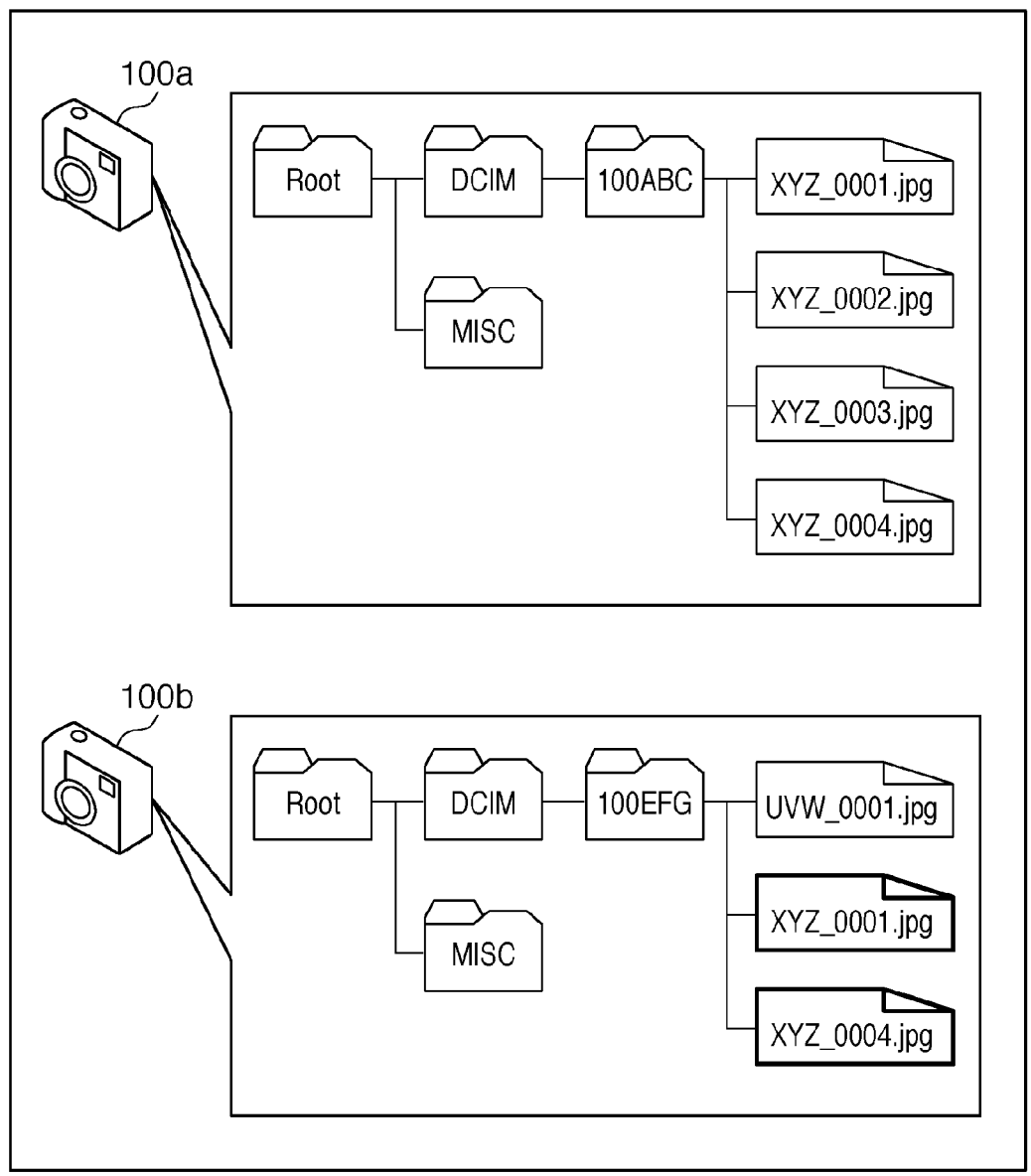
FIG. 11 is a conceptual diagram illustrating directory configurations of two digital cameras after data has been transferred.

By performing the aforementioned processing, when obtaining data from the digital camera 100a, the digital camera 100b can select data to be transferred through the digital camera 100b without maintaining the communication connection through close-proximity wireless communication. The selected data to be transferred will be obtained when the digital cameras 100a and 100b are communicatively reconnected through close-proximity wireless communication. Specifically, as shown in FIG. 11, XYZ_0001.jpg and XYZ_0004.jpg, which are designated based on the index information obtained from the digital camera 100a, will be obtained when the cameras are reconnected.

Note that it is assumed that the time period between when the digital camera 100b receives index information by communicating with the digital camera 100a for the first time and when the digital camera 100b starts communicating for the second time is defined as T. That is, it can be said that the time period T is a time period when the user is performing an operation of selecting an image to be received. However, if several days or a time that is greater than or equal to a certain time has elapsed since the digital camera 100b received index information by communicating with the digital camera 100a for the first time, there is no guarantee that the digital camera 100a still has an image indicated by the index information received from the digital camera 100a, at that point in time. Further, still more images may possibly be stored in the digital camera 100a.

In view of this, a user may set a valid period for the received index information. That is, when receiving index information, the time when the information is received (obtained from an RTC 134) is held and stored. If the time period T, which is the difference between the above time and the time when the second communication is reestablished, exceeds the set valid period (for example, 30 minutes), a device ID assigned to a device with which communication was performed last time is cleared or is made invalid so as to determine that communication to be the first communication.

Content of Processing Performed by Digital Camera 100a, Which Supplies Data

Figure 12:
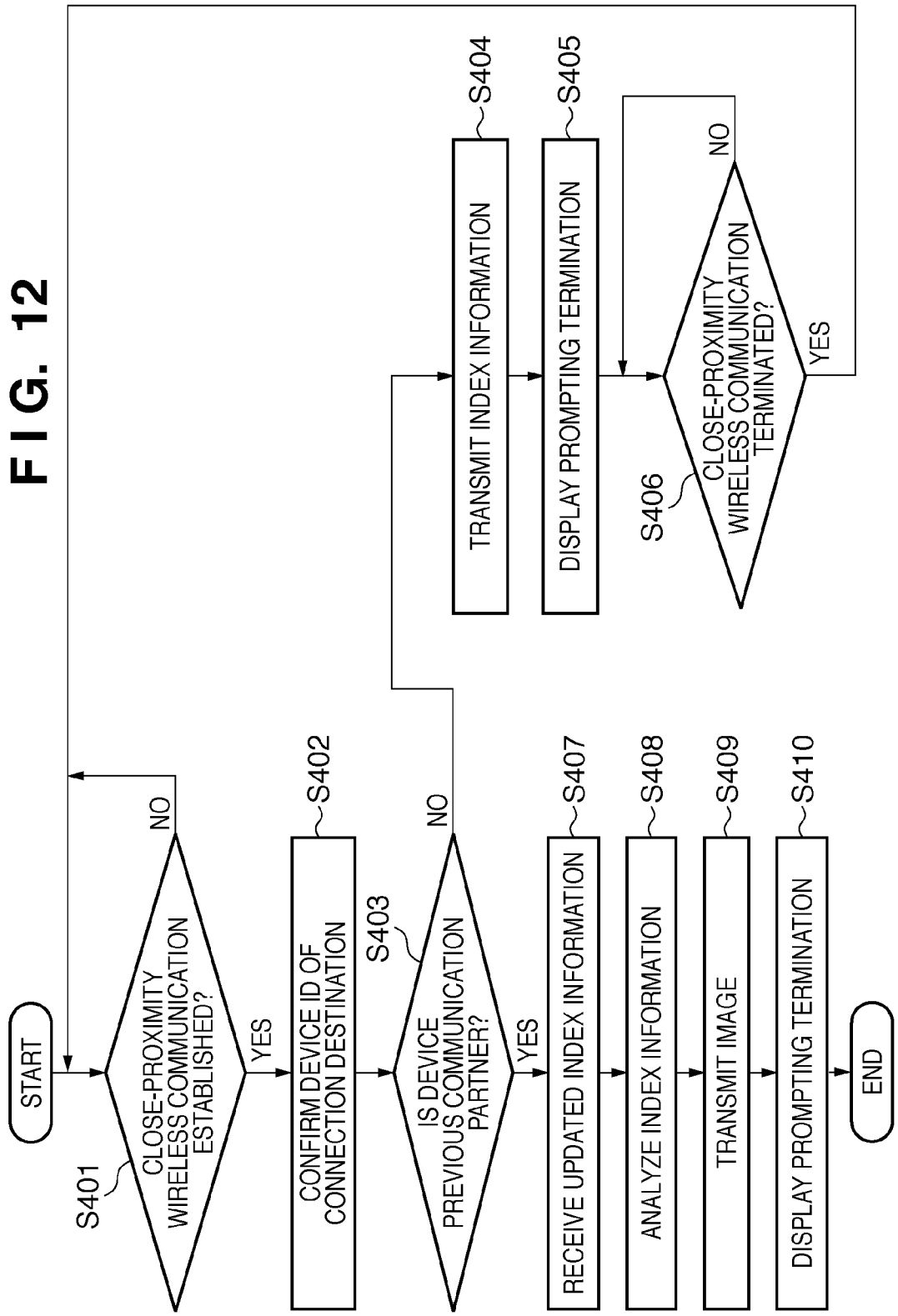
FIG. 12 is a flowchart showing processing performed by the digital camera that supplies data through close-proximity wireless communication.

Next, processing performed by a central processor 107 of the digital camera 100a will be described with reference to FIG. 12. Note that in the description below, the central processor 107 is the processor of the digital camera 100a. As shown in FIG. 12, in step S401, the central processor 107 performs processing for detecting communication connection through close-proximity wireless communication with the digital camera 100b, which is an external device. The processing in step S401 is similar to that in step S301. Specifically, the above processing is performed based on a detection signal outputted from a communication unit 129 to the central processor 107 in accordance with reception by a connector (antenna) 130, and repeatedly performed until the establishment of close-proximity wireless communication with an external device is detected.

In step S402, the central processor 107 performs processing for obtaining a device ID of a communication partner, similarly to the aforementioned step S302. Next, in step S403, the central processor 107 determines whether or not the communication partner is the external device with which communication was performed last time, or in other words, an external device with which communication was performed before the cameras are communicatively connected in step S401, as in step S303.

As for step S403 and steps thereafter, step S404 and steps thereafter will be firstly described assuming that the digital cameras 100a and 100b communicate for the first time. In step S404, the central processor 107 transmits index information to the digital camera 100b, which is an external device, through close-proximity wireless communication. In this step, the central processor 107 obtains a list of data stored in the storage unit 131, generates the aforementioned index information, and thereafter transmits the information to the digital camera 100b. Specifically, the central processor 107 transmits, to the digital camera 100b, a text file including a written-out file path, file size, and the like of the image file that is data stored in the storage unit 131, and thumbnail data generated from the image file, as the index information.

In step S405, after completing processing in step S404, that is, transmitting the index information, the central processor 107 performs notification processing for prompting termination of communication connection to the digital camera 100b through close-proximity wireless communication, as in step S304. By performing this notification processing, it is possible to prompt a user operating the digital camera 100a to cancel the communication connection through close-proximity wireless communication.

Next, in step S406, the central processor 107 performs processing for detecting whether or not communication connection to the external device through close-proximity wireless communication is terminated, as in step S306, and returns the processing to step S401. Accordingly, after step S406, the digital camera 100a is on standby until the cameras are communicatively connected through close-proximity wireless communication. During this period, the digital camera 100b displays the screen shown in FIG. 8B, and the user of the digital camera 100b selects an image to be transmitted, as already described above.

Next, the processing returns to step S401; the processing performed when the communication connection through close-proximity wireless communication between the digital cameras 100a and 100b is reestablished, or in other words, the processing in step S407 and the steps thereafter, will be described.

Figure 13:
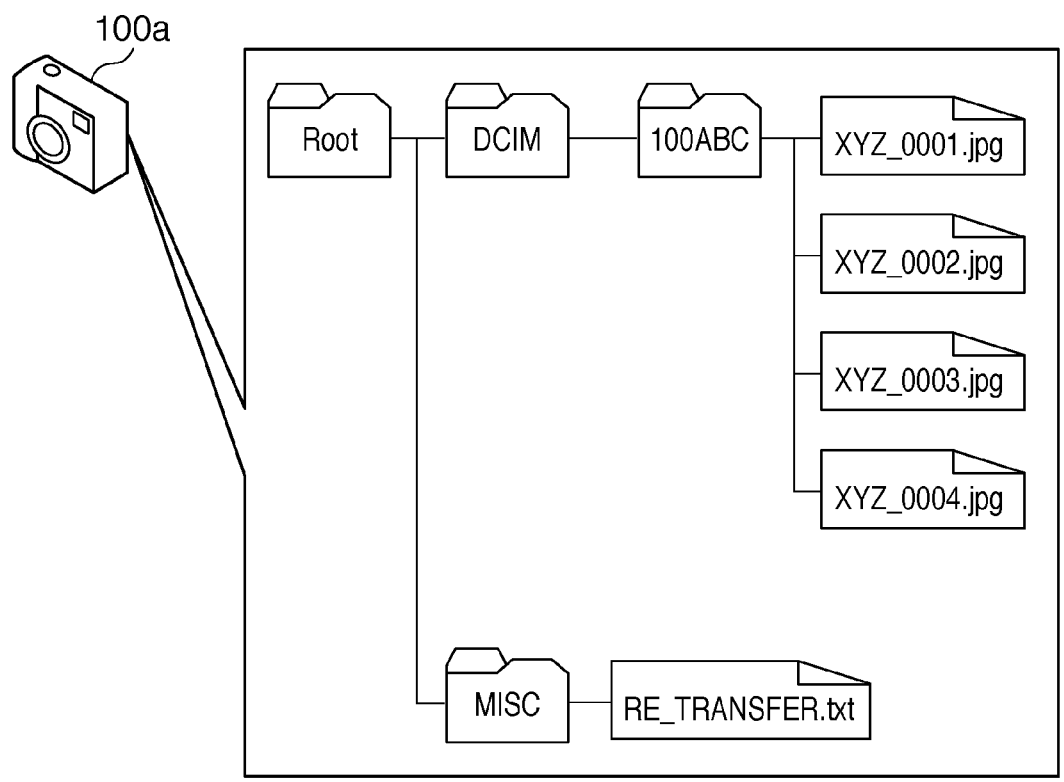
FIG. 13 is a conceptual diagram illustrating a directory configuration of a digital camera after index information has been received.

In step S407, the central processor 107 performs processing for receiving, from the reconnected digital camera 100b, the index information transmitted when the communication connection was performed before and thereafter updated. In this step, the central processor 107 receives the text file including the index information transmitted from the digital camera 100b in the aforementioned step S310. The received text file including the index information is stored in the storage unit 131 or the like. Specifically, as shown in FIG. 13, it is assumed that the received text file including the index information is stored in the "MISC" folder in the digital camera 100a as a text file (RE_TRANSFER.txt).

In step S408, the central processor 107 performs processing for analyzing the index information (RE_TRANSFER.txt) received in step S407. In the text file including the index information stored in the storage unit 131 in step S407, an image file to be transferred has been designated ("YES" has been added to the "TRANS" item) through the aforementioned processing in step S309. Accordingly, the central processor 107 analyses the text file including the index information and loads, from the storage unit 131, the image file to be transmitted to the digital camera 100b using the file path assigned to an image designated as an image file to be transferred. For example, XYZ_0001.jpg and XYZ_0004.jpg, which are illustrated in FIG. 13 and stored in the digital camera 100a, are loaded from the storage unit 131 as image files to be transferred.

In step S409, the central processor 107 performs processing for transmitting, to the digital camera 100b, the image file loaded from the storage unit 131 in step S408. In step S409, for example, the aforementioned XYZ_0001.jpg and XYZ_0004.jpg are transmitted to the digital camera 100b.

In step S409, as in step S311, a message indicating that data is being transferred as shown in FIG. 10 is displayed on an image displaying unit 112 of the digital camera 100a. Note that if communication is terminated partway through the process, it is also possible to re-transmit the image file by the central processor 107 re-performing processing in step S409 when the cameras next communicate. Further, the central processor 107 may determine an image that has not been transmitted when communication is terminated and transmit the image that has not been transmitted when the cameras communicate next time.

In step S410, when the central processor 107 detects completion of transmitting the image file in step S409, the central processor 107 stops displaying the message as illustrated in FIG. 10. Next, the central processor 107 performs notification processing for displaying, on the image displaying unit 112, a message that prompts cancellation of communication connection as illustrated in FIG. 8A. That is, the digital camera 100a can prompt the user operating the digital camera 100a to cancel communication connection through close-proximity wireless communication by performing the notification processing, after transmitting the designated data. Further, in step S410, the text file including the unnecessary index information (RE_TRANSFER.txt as illustrated in FIG. 13) may be erased.

By performing the aforementioned processing, the digital camera 100b can select and designate data to be transferred without maintaining a communication connection through close-proximity wireless communication when the digital camera 100a has supplied data to the digital camera 100b. Further, the data that has been selected by the digital camera 100b so as to be transferred will be supplied from the digital camera 100a when the cameras are communicatively reconnected through close-proximity wireless communication. Specifically, as illustrated in the aforementioned FIG. 11, XYZ_0001.jpg and XYZ_0004.jpg designated by the digital camera 100b will be supplied when the cameras are reconnected.

It should be noted that description in the aforementioned exemplary embodiment indicates one example and not limiting. The configuration and operations in the aforementioned exemplary embodiment can be altered as appropriate.

Although the present exemplary embodiment shows, for example, a configuration in which digital cameras transmit and receive data, one of the devices may be an information processing apparatus such as a personal computer or a television system including a communication function.

OTHER EXEMPLARY EMBODIMENTS

The aforementioned exemplary embodiment can also be realized with software by a computer (or CPU, MPU, etc.) of a system or an apparatus. Therefore, the computer program itself installed in a computer in order to cause the computer to implement the aforementioned exemplary embodiment realizes the present invention. That is, the scope of the present invention includes the computer program itself for implementing the functions of the aforementioned exemplary embodiment.

It should be noted that the computer program for realizing the aforementioned exemplary embodiment may be in any form as long as the program can be read by a computer. For example, the program can be configured using object code, a program executed by an interpreter, script data supplied to an OS, and the like, but is not intended to be limited thereto. The computer program for implementing the aforementioned exemplary embodiment is supplied to a computer via a storage medium or through hard-wired/wireless communication. Examples of a storage medium used for supplying the program include a flexible disk, a hard disk, a magnetic storage medium such as magnetic tape, an optical/magneto-optical storage medium such as an MO, a CD or a DVD, a non-volatile semiconductor memory and the like.

A method with which a server on a computer network is utilized can be given as an example of a method for supplying the computer program using hard-wired/wireless communication. In this case, a data file (program file) that can embody the computer program that realizes the present invention is stored in the server. The program file may be an executable file or may be source code. A client computer that accesses the server can be supplied the program by downloading the program file from the server. In this case, the program file can be divided into a plurality of segment files, and the segment files may be distributed among different servers. In other words, a server apparatus that supplies the program file for realizing the aforementioned exemplary embodiment to a client computer also falls within the scope of the present invention.

Furthermore, the computer program for realizing the aforementioned exemplary embodiment may be encrypted and stored in a storage medium, which is then distributed; key information for decrypting the program may be supplied to users who satisfy a predetermined condition, thereby allowing those users to install the program in their computers. The key information can be supplied by, for example, allowing the key information to be downloaded from a homepage via the Internet. Furthermore, the computer program for realizing the aforementioned exemplary embodiment may utilize the functions of an OS already running on the computer. Further still, the computer program for realizing the aforementioned exemplary embodiment may be partially configured of firmware for an expansion board or the like installed in the computer or may be executed by a CPU provided in that expansion board or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-171237, filed Jun. 30, 2008 which is hereby incorporated by reference herein in its entirety.

The invention claimed is:

1. A data receiving apparatus comprising:

a communication unit that communicates with a data transmitting apparatus through close-proximity wireless communications;

a detecting unit that detects a state of a connection to the data transmitting apparatus, wherein the communication unit receives, from the data transmitting apparatus, index information indicating a list of data stored in a storage medium of the data transmitting apparatus if the detecting unit detects that a first connection through close-proximity wireless communication with the data transmitting apparatus has been established via the communication unit; and a designation unit that designates data to be received from the data transmitting apparatus based on the index information, after receiving the index information, if the detection unit detects that the first connection through close-proximity wireless communication with the data transmitting apparatus has been terminated, wherein, after the detecting unit detects the first connection, the designation unit cannot designate data to be received until the first connection is disconnected, wherein the communication unit receives, from the data transmitting apparatus, the data designated by the designation unit if a second connection through close-proximity wireless communication with the data transmitting apparatus is established via the communication unit, after the designation unit has designated the data to be received from the data transmitting apparatus and after the detecting unit has detected a termination of the first connection.

2. The data receiving apparatus according to claim 1, further comprising:

a memory that stores identification information for identifying an apparatus; and a determination unit that, if the detecting unit detects that a connection with an external apparatus has been established after having detected the termination of the first connection, compares the identification information stored in the memory in advance to identification information received from the external apparatus, and determines whether a second connection with the data transmitting apparatus with which the first connection was established has been established has been established.

3. The data receiving apparatus according to claim 1, further comprising a notification unit that notifies a user with a notification that prompts the termination of the first connection with the data transmitting apparatus after receiving the index information from the data transmitting apparatus via the communication unit.

4. The data receiving apparatus according to claim 1, further comprising a displaying unit that displays the list of data stored in the storage medium of the data transmitting apparatus based on the index information, wherein the designated data includes information specifying data, designated by a user, among the list of data.

5. The data receiving apparatus according to claim 1, wherein the designation unit designates the data to be received from the data transmitting apparatus after the detecting unit has detected the termination of the first connection.

6. A system comprising a data receiving apparatus and a data transmitting apparatus,
wherein the data receiving apparatus comprises:
a first communication unit that communicates with a data transmitting apparatus through close-proximity wireless communications;
a first detecting unit that detects a state of a connection to the data transmitting apparatus;
wherein the first communication unit receives, from the data transmitting apparatus, index information indicating a list of data stored in a storage medium of the data transmitting apparatus if the first detecting unit detects that a first connection through close-proximity wireless communication with the data transmitting apparatus has been established via the first communication unit, and
a designation unit that designates data to be received from the data transmitting apparatus based on the index information, after receiving the index information, if the detection unit detects that the first connection through close-proximity wireless communication with the data transmitting apparatus has been terminated, wherein, after the first detecting unit detects the first connection, the designation unit cannot designate data to be received until the first connection is disconnected;
wherein the first communication unit receives, from the data transmitting apparatus, the data designated by the designation unit if a second connection through close-proximity wireless communication with the data transmitting apparatus is established via the first communication unit, after the designation unit has designated the data to be received from the data transmitting apparatus and after the first detecting unit has detected a termination of the first connection through close-proximity wireless communication, and
wherein the data transmitting apparatus comprises:
a second communication unit that communicates with the data receiving apparatus through close-proximity wireless communications; and
a second detecting unit that detects a state of a connection to the data receiving apparatus,
wherein the second communication unit transmits, to the data receiving apparatus, the index information indicating the list of data stored in the storage medium of the data transmitting apparatus if the second detecting unit detects that a first connection through close-proximity wireless communication with the data receiving apparatus has been established via the second communication unit, and
wherein the second communication unit transmits, to the data receiving apparatus, the data selected by the data receiving apparatus based on the index information if a second connection through close-proximity wireless communication with the data receiving apparatus is established via the second communication unit, after the index information has been transmitted and after the second detecting unit has detected a termination of the first connection through close-proximity wireless communication with the data receiving apparatus.

7. The system according to claim 6, wherein the data transmitting apparatus further comprises:
a memory that stores identification information for identifying an apparatus; and
a determination unit that, if the second detecting unit detects that a connection with an external apparatus has been established after having detected the termination of the first connection with the data receiving apparatus, compares the identification information stored in the memory in advance to identification information received from the data receiving apparatus, and determines whether a second connection with the data receiving apparatus with which the first connection was established has been established.

8. The system according to claim 6, wherein the data transmitting apparatus further comprises a notification unit that notifies a user with a notification that prompts the termination of the first connection with the data receiving apparatus after transmitting the index information to the data receiving apparatus via the second communication unit.

9. A method for controlling a data receiving apparatus having a communication unit that performs close-proximity wireless communications, the method comprising:
detecting a state of a connection to a data transmitting apparatus via the communication unit;
receiving, from the data transmitting apparatus via the communication unit, index information indicating a list of data stored in a storage medium of the data transmitting apparatus if a first connection through close-proximity wireless communication with the data transmitting apparatus that has been established via the communication unit is detected;
designating data to be received from the data transmitting apparatus based on the index information after receiving the index information if the first connection through close-proximity wireless communication with the data transmitting apparatus is detected to have been terminated, wherein, after the detecting detects the first connection, the designating cannot designate data to be received until the first connection is disconnected; and
receiving, from the data transmitting apparatus, the designated data via the communication unit if a second connection through close-proximity wireless communication with the data transmitting apparatus is established via the communication unit, after the data to be received from the data transmitting apparatus has been designated and after a termination of the first connection has been detected.

10. A method for controlling a system including a data receiving apparatus having a first communication unit that performs close-proximity wireless communication communications, and a data transmitting apparatus having a second communication unit that performs close-proximity wireless communications, the method comprising:
detecting, by the data receiving apparatus, a state of a connection to the data transmitting apparatus via the first communication unit;
receiving, by the data receiving apparatus, from the data transmitting apparatus via the first communication unit, index information indicating a list of data stored in a storage medium of the data transmitting apparatus if a first connection through close-proximity wireless communication with the data transmitting apparatus that has been established via the first communication unit is detected;
designating, by the data receiving apparatus, data to be received from the data transmitting apparatus based on the index information after receiving the index information, if the first connection through close-proximity wireless communication with the data transmitting apparatus is detected to have been terminated, wherein, after the detecting detects the first connection, the designating cannot designate data to be received until the first connection is disconnected;
receiving, by the data receiving apparatus, from the data transmitting apparatus, the designated data via the first communication unit if a second connection with the data transmitting apparatus is established via the first communication unit, after the data to be received from the data transmitting apparatus has been designated and after a termination of the first connection through close-proximity wireless communication with the data transmitting apparatus has been detected;

detecting, by the data transmitting apparatus, a state of a connection to the data receiving apparatus via the second communication unit;

transmitting, by the data transmitting apparatus, to the data receiving apparatus via the second communication unit, the index information indicating the list of data stored in the storage medium of the data transmitting apparatus if a first connection through close-proximity wireless communication with the data transmitting apparatus that has been established via the second communication unit is detected; and transmitting, by the data transmitting apparatus, to the data receiving apparatus via the second communication unit, the data selected by the data receiving apparatus based on the index information if a second connection with the data transmitting apparatus is established via the second communication unit, after the index information has been transmitted and after the termination of the first connection through close-proximity wireless communication with the data transmitting apparatus has been detected.

11. A non-transitory computer-readable storage medium storing computer-executable code that, when executed causes a data receiving apparatus having a communication unit that performs close-proximity wireless communications to:

detect a state of a connection to a data transmitting apparatus via the communication unit;

receive, from the data transmitting apparatus via the communication unit, index information indicating a list of data stored in a storage medium of the data transmitting apparatus if a first connection through close-proximity wireless communication with the data transmitting apparatus that has been established via the communication unit is detected;

designate data to be received from the data transmitting apparatus based on the index information, after receiving the index information, if the first connection through close-proximity wireless communication with the data transmitting apparatus is detected to have been terminated, wherein, after detection of the first connection, data to be received cannot be designated until the first connection is disconnected; and receive, from the data transmitting apparatus, the designated data via the communication unit if a second connection with the data transmitting apparatus is established via the communication unit, after the data to be received from the data transmitting apparatus has been designated and after a termination of the first connection through close-proximity wireless communication has been detected.

12. A non-transitory computer-readable storage medium storing computer-executable code that, when executed, causes a data receiving apparatus having a first communication unit that performs close-proximity wireless communication communications to:

detect a state of a connection to the data transmitting apparatus via the first communication unit;

receive from the data transmitting apparatus via the first communication unit, index information indicating a list of data stored in a storage medium of the data transmitting apparatus if a first connection through close-proximity wireless communication with the data transmitting apparatus that has been established via the first communication unit is detected;

designate data to be received from the data transmitting apparatus based on the index information, after receiving the index information, if the first connection through close-proximity wireless communication with the data transmitting apparatus is detected to have been terminated, wherein, after detection of the first connection, data to be received cannot be designated until the first connection is disconnected; and receive, by the data receiving apparatus, from the data transmitting apparatus, the designated data via the first communication unit if a second connection with the data transmitting apparatus is established via the first communication unit, after the data to be received from the data transmitting apparatus has been designated and after a termination of the first connection through close-proximity wireless communication with the data transmitting apparatus has been detected, wherein execution of the computer-executable code further causes a data transmitting apparatus having a second communication unit that performs close-proximity wireless communications to:

detect a state of a connection to the data receiving apparatus via the second communication unit;

transmit to the data receiving apparatus via the second communication unit, the index information indicating the list of data stored in the storage medium of the data transmitting apparatus if a first connection through close-proximity wireless communication with the data transmitting apparatus that has been established via the second communication unit is detected; and transmit to the data receiving apparatus via the second communication unit, the data selected by the data receiving apparatus based on the index information if a second connection with the data transmitting apparatus is established via the second communication unit, after the index information has been transmitted and after the termination of the first connection through close-proximity wireless communication with the data transmitting apparatus has been detected.

* * * * *